United States Patent [19]
Seibel

[11] Patent Number: 5,904,388
[45] Date of Patent: May 18, 1999

[54] PLASTIC BAG TRANSPORT DEVICE

[76] Inventor: Jonathan H. Seibel, 73 Oriole Dr., Ephrata, Pa. 17522-1222

[21] Appl. No.: 09/070,117

[22] Filed: Apr. 30, 1998

[51] Int. Cl.[6] .................................................. B65D 33/06
[52] U.S. Cl. ......................... 294/163; 294/141; 294/159; 294/168; 294/169
[58] Field of Search .................................. 294/137, 141, 294/158, 159, 162, 163, 165, 167–171; 383/13, 22, 24; 16/114 R

[56] References Cited

U.S. PATENT DOCUMENTS

| | | | |
|---|---|---|---|
| 697,879 | 4/1902 | Phillips | 294/170 |
| 1,468,848 | 9/1923 | Wear. | |
| 3,197,101 | 7/1965 | Brown | 294/158 |
| 4,004,722 | 1/1977 | Olivier | 224/45 P |
| 5,150,938 | 9/1992 | Gans | 294/170 |
| 5,199,758 | 4/1993 | Howell | 294/171 |
| 5,263,755 | 11/1993 | Thompson | 294/137 |
| 5,368,393 | 11/1994 | Normann | 294/171 |
| 5,441,323 | 8/1995 | Goddard | 294/137 |
| 5,509,708 | 4/1996 | Nathan | 294/141 |

FOREIGN PATENT DOCUMENTS

| | | | |
|---|---|---|---|
| 2659-626 | 9/1991 | France | 294/137 |
| 5-319443 | 12/1993 | Japan | 294/159 |
| 113180 | 2/1918 | United Kingdom | 294/158 |

*Primary Examiner*—Dean Kramer
*Attorney, Agent, or Firm*—Henderson & Sturm

[57] ABSTRACT

A plastic bag transport device 10 including an upper arm member 20 and a lower arm member 40 operatively connected together on one end by an intermediate unit 13 and further provided with a latch unit 14 on the other end to define an enclosure that is dimensioned to receive the handles 100 of a plurality of plastic bags. The handles 100 are supported in a staggered fashion on the lower arm member 40 and the upper arm member 20 forms the hand grip portion of the device 10.

8 Claims, 1 Drawing Sheet

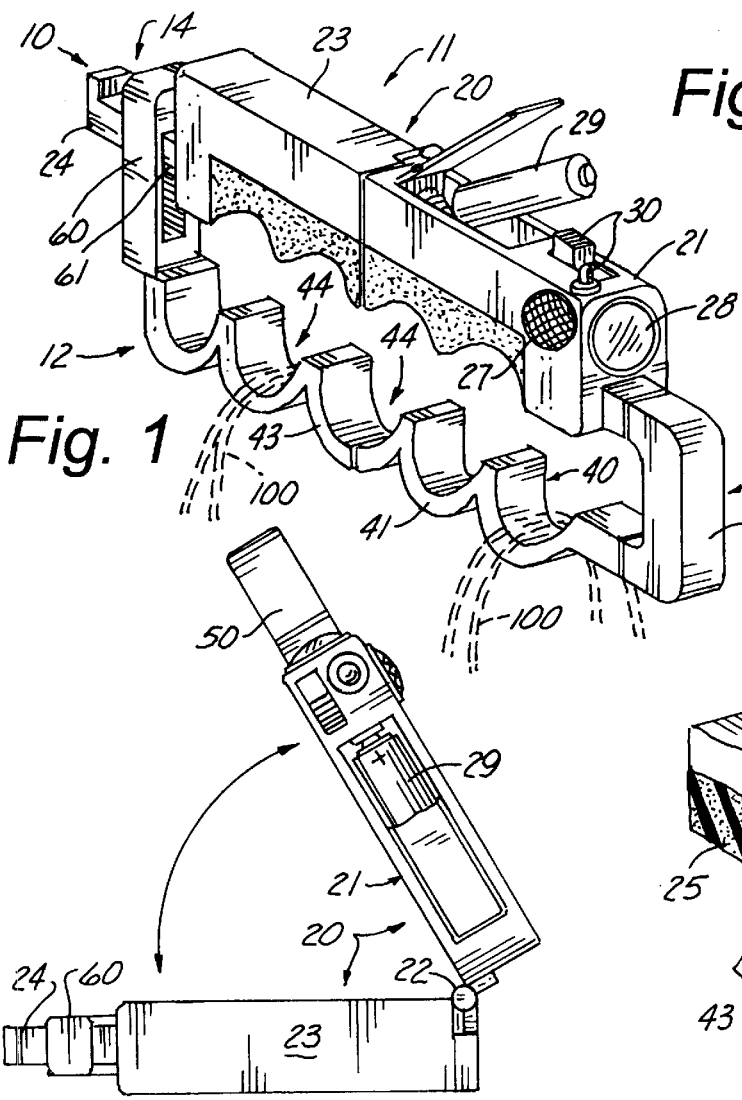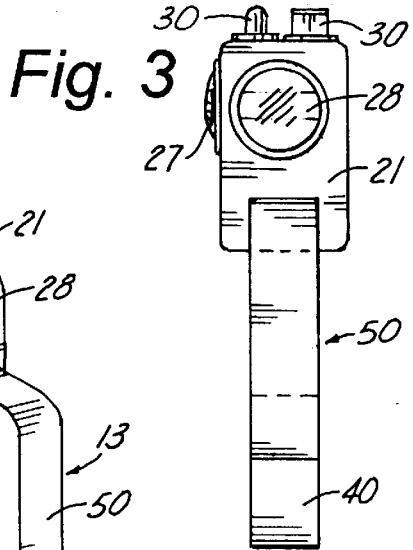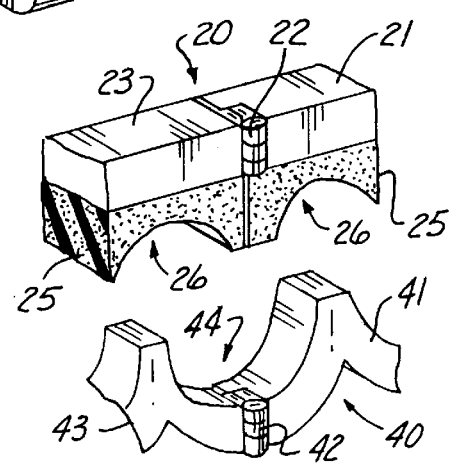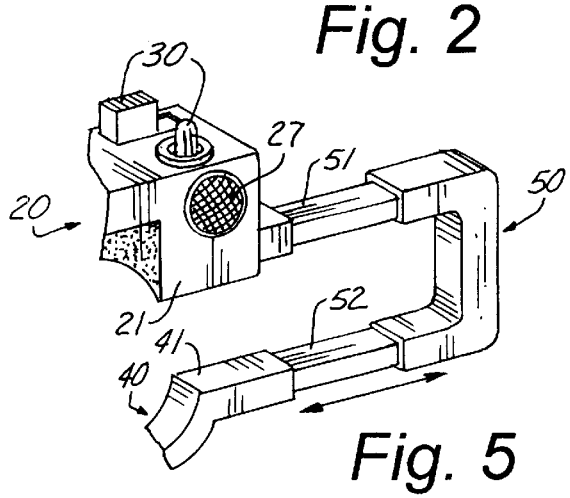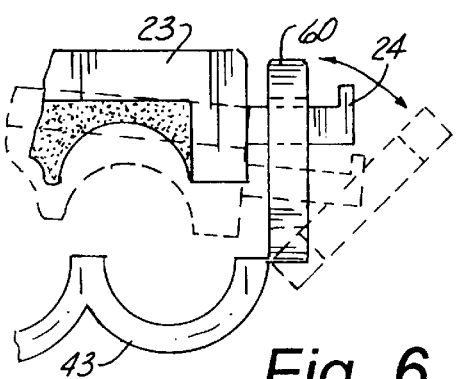

PLASTIC BAG TRANSPORT DEVICE

REFERENCE TO MICROFICHE APPENDIX

Not applicable.

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to the field of auxiliary carrying handle devices in general, and in particular to an auxiliary carrying handle that can be used to transport a plurality of plastic shopping bags by their handles.

2. Description of Related Art

As can be seen by reference to the following U.S. Pat. Nos. 1,468,848; 4,004,722; 5,199,758; and 5,509,708, the prior art is replete with myriad and diverse auxiliary handle devices for facilitating the carrying of packages and plastic shopping bags.

While all of the aforementioned prior art constructions are more than adequate for the basic purpose and function for which they have been specifically designed, they are uniformly deficient with respect to their failure to provide a simple, efficient, and practical plastic bag transport device that is specifically designed to transport a plurality of plastic bags wherein the handles of the bags may be arrayed in a staggered weight distributing fashion on the transport device.

As most people are aware, while their plastic shopping or grocery style bags facilitate the transport of a number of bags at one time, the very thinness of the shopping bag handles often cuts into the user's hands or otherwise creates a great deal of discomfort due to the weight of the individual bags and the narrow application of force on the user's fingers.

As a consequence of the foregoing situation, there has existed a longstanding need for a new and improved type of plastic bag transport device that is specifically designed to support the handles of a plurality of plastic bags in a spaced apart relationship with one another, and the provision of such a construction is a stated objective of the present invention.

BRIEF SUMMARY OF THE INVENTION

Briefly stated, the plastic bag transport device that forms the basis of the present invention comprises in general an upper arm unit, a lower arm unit, an intermediate unit disposed on one end of the upper and lower arm units and a latch unit disposed on the other end of the upper and lower arm units.

As will be explained in greater detail further on in the specification, the upper arm unit functions as a cushioned hand grip member for transporting the device while the lower arm unit is contoured to segregate and support the handles from each of a plurality of plastic bags in a staggered fashion.

In addition, the intermediate unit acts as a quasi-hinge element between one end of the upper and lower arm units and includes a handle extension member which can expand the effective length of the device to accommodate additional plastic bags or the like. The latch unit includes a pivoted latch member that can releasably engage the other end of the upper and lower arm units to retain the handles of the plastic bags between the upper and lower arm units.

Furthermore, this invention also contemplates the use of a hinged connection on both the upper and lower arm members so that the device can be collapsed for storage, plus the use of both an audible alarm and an illumination source for both safety and convenience.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the plastic bag transport device that forms the basis of the present invention;

FIG. 2 is a top plan view showing the hinged nature of the device;

FIG. 3 is an end view showing the accessory side of the device;

FIG. 4 is an isolated detail view of the hinged midpoint of the device;

FIG. 5 is an isolated detail view of the extension unit that forms the operative connection between the upper and lower arm units of the device;

FIG. 6 is an isolated detail view of the latch unit which selectively engages the upper and lower arm units together.

DETAILED DESCRIPTION OF THE INVENTION

As can be seen by reference to the drawings, and in particularly to FIG. 1, the plastic bag transport device that forms the basis of the present invention is designated generally by the reference number 10. The device 10 comprises in general, an upper arm unit 11, a lower arm unit 12, a hinge-like intermediate unit 13, and a latch unit 14. These units will now be described in seriatim fashion.

As shown in FIGS. 1, 2, and 4, the upper arm unit 11 comprises an upper arm member 20 having a captive upper arm segment 21 hingedly connected as at 22 to an upper free arm segment 23. The outboard end of the free arm segment 23 is provided with an elongated hook portion 24.

In addition, the underside of both the captive 21 and free 23 upper arm segments are provided with a contoured layer of resiliently deformable material 25 having recesses 26 which are dimensioned to receive a user's finger.

Furthermore, as shown in FIGS. 1, 2, 3, and 5, the captive upper arm segment 21 is provided with an audible alarm 27 and an illumination source 28 which are powered by a battery 29 and controlled by conventional switch elements 30.

As can best be seen by reference to FIGS. 1 and 4, the lower arm unit 12 comprises a contoured lower arm member 40 having a captive lower arm segment 41 hingedly connected as at 42 to a lower free arm segment 43. Both the captive 41 and free 43 lower arm segments are provided with a plurality of recesses 44. Each of the recesses 44 are dimensioned to receive the handle portions 100 of a conventional handle equipped plastic shopping/grocery bag (not shown) such that a plurality of shopping bags can be suspended from the lower arm member 40 in a well recognized fashion.

Turning now to FIGS. 1 and 5, it can be seen that the hinge-like intermediate unit 13 comprises a generally C-shaped handle extension member 50 dimensioned to slidably receive a pair of extension arm elements 51, 52 wherein one extension arm element 51 projects outwardly from the outboard end of the upper arm member 20 and the other extension arm element 52 projects outwardly from the lower arm member 40 to expand the bag carrying capacity of the upper 20 and lower 40 arm members.

In addition, the hinge-like intermediate unit 13 forms the operative connection between the upper 20 and the lower 40 arm members and also functions as a quasi-hinge element that allows the free ends of the upper 20 and lower 40 arm members to be flexed towards one another for reasons that will be explained presently.

As can best be seen by reference to FIGS. 1 and 6, the latch unit 14 comprises an elongated latch member 60 pivotally secured on the outboard end of the lower free arm segment 43. The latch member 60 is provided with an enlarged opening 61 which is dimensioned to captively engage the hook portion 24 on the upper arm member 20. The latch member 60 is disengaged to insert and remove the bag handles 100 into the recesses 44 in the lower arm member, and the latch member 60 is engaged to retain the bag handles 100 within the enclosure defined by the upper 11 and lower 12 arm units the intermediate unit 13 and the latch unit 14.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A plastic bag transport device of captively engaging the handles of a plurality of plastic bags wherein the transport device comprises:

an upper arm unit including an upper arm member having opposite ends;

a lower arm unit including a lower arm member having opposite ends;

an intermediate unit which operatively connects one of the ends of the upper and lower arm members together, wherein the intermediate unit comprises a generally C-shaped handle extension member dimensioned to slidably receive a pair of extension arm elements wherein each of the extension arm elements are operatively connected to one of said arm members; and a latch unit which releasably engages the other ends of the upper and lower arm members together, wherein said upper and lower arm units, the intermediate unit, and the latch unit define an enclosure for captively engaging the handles of a plurality of plastic bags.

2. The device as in claim 1 wherein said lower arm member is contoured and provided with a plurality of recesses which are dimensioned to receive the handles of a plurality of plastic bags.

3. The device as in claim 2 wherein the bottom of the upper arm member is provided with a layer of resiliently deformable material.

4. The device as in claim 3 wherein the upper and lower arm members are both provided with a pair of arm segments which are hingedly connected to one another.

5. The device as in claim 3 wherein one of said arm members is provided with an audible alarm.

6. The device as in claim 3 wherein one of said arm members is provided with an illumination source.

7. The device as in claim 3 wherein one of said arm members is provided with an illumination source and an audible alarm.

8. The device as in claim 1 wherein the latch unit includes a latch member pivotally connected to one of said arm members and dimensioned to releasably engage the other of the arm members.

* * * * *